United States Patent
Kurata et al.

(10) Patent No.: US 7,427,191 B2
(45) Date of Patent: *Sep. 23, 2008

(54) OIL PUMP

(75) Inventors: Masakazu Kurata, Kanagawa (JP); Mizuo Otaki, Kanagawa (JP)

(73) Assignee: Hitachi, Ltd., Tokyo (JP)

( * ) Notice: Subject to any disclaimer, the term of this patent is extended or adjusted under 35 U.S.C. 154(b) by 12 days.

This patent is subject to a terminal disclaimer.

(21) Appl. No.: 11/243,971

(22) Filed: Oct. 6, 2005

(65) Prior Publication Data

US 2006/0073060 A1   Apr. 6, 2006

(30) Foreign Application Priority Data

Oct. 6, 2004   (JP) ............................. 2004-293148

(51) Int. Cl.
*F04C 2/10*   (2006.01)

(52) U.S. Cl. .................. 418/32; 418/166; 418/171; 418/133

(58) Field of Classification Search ............... 418/171, 418/166, 132, 133, 32
See application file for complete search history.

(56) References Cited

U.S. PATENT DOCUMENTS

| | | | | |
|---|---|---|---|---|
| 2,822,124 A | * | 2/1958 | Klessig et al. .............. | 418/108 |
| 2,966,118 A | * | 12/1960 | McAlvay .................... | 417/239 |
| 3,695,791 A | * | 10/1972 | Brundage ................... | 418/131 |
| 4,199,305 A | * | 4/1980 | Pareja ........................ | 417/440 |
| 4,922,781 A | * | 5/1990 | Peiji ........................... | 74/462 |
| 5,797,734 A | * | 8/1998 | Kizer et al. .................. | 418/9 |
| 5,860,884 A | * | 1/1999 | Jolliff ......................... | 475/89 |
| 6,089,843 A | * | 7/2000 | Kondoh ..................... | 418/179 |
| 6,402,488 B2 | * | 6/2002 | Watanabe et al. ........... | 418/178 |
| 2005/0063851 A1 | * | 3/2005 | Phillips ...................... | 418/133 |

FOREIGN PATENT DOCUMENTS

JP   60085284 A   *   5/1985

* cited by examiner

*Primary Examiner*—Thomas Denion
*Assistant Examiner*—Mary A Davis
(74) *Attorney, Agent, or Firm*—Antonelli, Terry, Stout & Kraus, LLP.

(57) ABSTRACT

In an oil pump employing a cam ring, and inner and outer rotors in meshed-engagement, two housings are provided at opposite ends of the cam ring. A plurality of volume chambers are defined between inner and outer teeth of the rotors. Two axial holes are formed in the cam ring. A first one of the axial holes is positioned corresponding to a mesh portion having a minimum volume, whereas the second axial hole is positioned corresponding to a trap portion having a maximum volume. A suction port and a discharge port are formed at least in one of the housings and are open to the volume chambers between the mesh and trap portions. All are positioned at a line symmetry of an axis line between the mesh and trap portions. At least one of the two axial holes is formed as a slot extending along the axis lines.

18 Claims, 5 Drawing Sheets

OIL PUMP

The present invention relates to a rotary pump which is operative for suction and discharge of a fluid.

A rotary pump is disclosed in Japanese non-examined publication JP-A-8-42418. According to the publication, a cam ring is fixed to a housing by a pair of screws. The screws are symmetrically located with regard to a line passing through a mesh portion in which the pump volume is minimum and a trap portion in which the pump volume is maximum.

A hole which receives the screw for assembling a cam ring and housing is formed slightly large for permitting a machining error. Thus, it is possible to permit for an eccentricity of the cam ring in the direction of the width thereof by permitting. When the pump described above is applied for a reversible pump switching suction and a discharge based on a direction of a rotation of a trochoid pump, however, each of the characteristics of discharge could be changed between normal and reverse direction of the rotation.

SUMMARY OF THE INVENTION

It is an object of present invention to provide an oil pump whose discharge characteristics are stable between normal and reverse direction of the rotation.

To achieve the above object, according to an aspect of the present invention, there is provided an oil pump that comprises a cam ring, an outer rotor that has an inner teeth and is rotatably provided inside of the cam ring, an inner rotor that has an outer teeth and is engaged with the inner teeth of the outer rotor, a drive shaft which rotatably drives the inner rotor, first housing and second housing which are provided at opposite ends of the cam ring, and a plurality of volume chambers are formed between the inner teeth of the outer rotor and the outer teeth of the inner rotor. A first axial hole, which is formed in the cam ring, is positioned corresponding to a mesh portion having a minimum volume of the volume chambers. A second axial hole, which is formed in the cam ring, is positioned corresponding to a trap portion having a maximum volume of the volume chambers. A suction port and a discharge port, which are formed at least in one of the housings, are open to the volume chambers between the mesh portion and the trap potion. The suction port and the discharge port are positioned in a line of symmetry of an axis line that connects between the mesh portion and a trap portion. A first dowel pin is inserted to the first housing, the second housing and the first axis hole, a second dowel pin is inserted into the first housing, the second housing and the second axis hole. The suction port and the discharge port are reversed depending on a rotary direction of the drive shaft. At least one of the first and second axis holes is formed as a slot extending along the axis line.

According to an other aspect of the present invention, an oil pump comprises a cam ring, an outer rotor having inner teeth and being rotatably provided inside of the cam ring, an inner rotor having an outer teeth, which is engageable with the inner teeth of the outer rotor, a drive shaft which rotatably drives the inner rotor, a first housing and second housing which are provided at opposite ends of the cam ring, and a plurality of volume chambers are formed between the inner teeth of the outer rotor and the outer teeth of the inner rotor. A first axial hole, which is formed in the cam ring and is positioned corresponding to a mesh portion having a minimum volume of the volume chambers, a second axial hole, which is formed in the cam ring and is positioned corresponding to a trap portion having a maximum volume of the volume chambers. A suction port and a discharge port, which are formed at least in one of said housings, are open to the volume chambers between the mesh portion and the trap potion and are positioned on a line of symmetry of an axis line between the mesh portion and a trap portion. A first dowel pin is inserted into the first housing, the second housing and the first axis hole, a second dowel pin is inserted into the first housing, the second housing and the second axis hole. And the suction port and the discharge port are reversed depending on a rotary direction of the drive shaft. The first dowel pin and the second dowel pin are provided at positions that are symmetrical with respect to the axis line on the first and the second housing, and the suction port and the discharge port are provided at positions that are symmetrical with respect to the axis line.

According to a further aspect of the present invention, an oil pump comprises a cam ring, an outer rotor having inner teeth, which is rotatably provided inside of the cam ring, an inner rotor having outer teeth, which is engageable with inner teeth of the outer rotor, a drive shaft which rotatably drives the inner rotor, a first housing and second housing which are provided at opposite ends of the cam ring, and a plurality of volume chambers are formed between the inner teeth of the outer rotor and the outer teeth of the inner rotor. A first axial hole, which is formed in the cam ring and is positioned corresponding to a mesh portion having a minimum volume of the volume chambers. A second axial hole, which is formed in the cam ring and is positioned corresponding to a trap portion having a maximum volume of the volume chambers. A suction port and a discharge port, which are formed at least in one of said housings and are open to the volume chambers between the mesh portion and the trap potion. The suction port and the discharge port are positioned on a line of symmetry of an axis line to connect between the mesh portion and the trap portion. A first dowel pin is inserted into the first housing, the second housing and the first axis hole. A second dowel pin is inserted into the first housing, the second housing and the second axis hole. The suction port and the discharge port are reversed depending on a rotary direction of the drive shaft. The second axis hole is formed as a slot extending along the axis line.

DETAILED DESCRIPTION OF THE INVENTION

Figure 1:
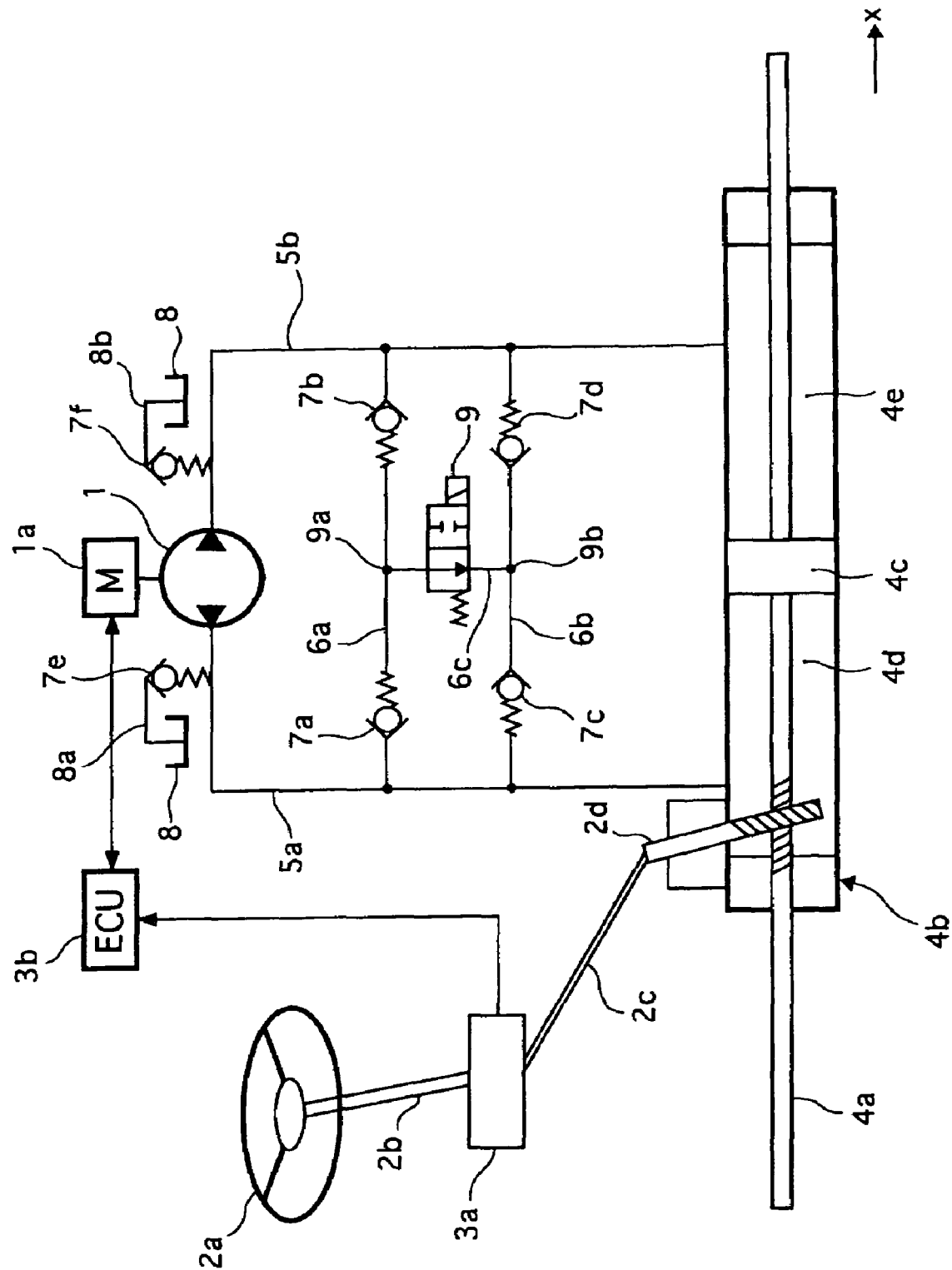
FIG. 1 shows a power steering system applying an oil pump according to a first embodiment of the present invention.
Figure 2:
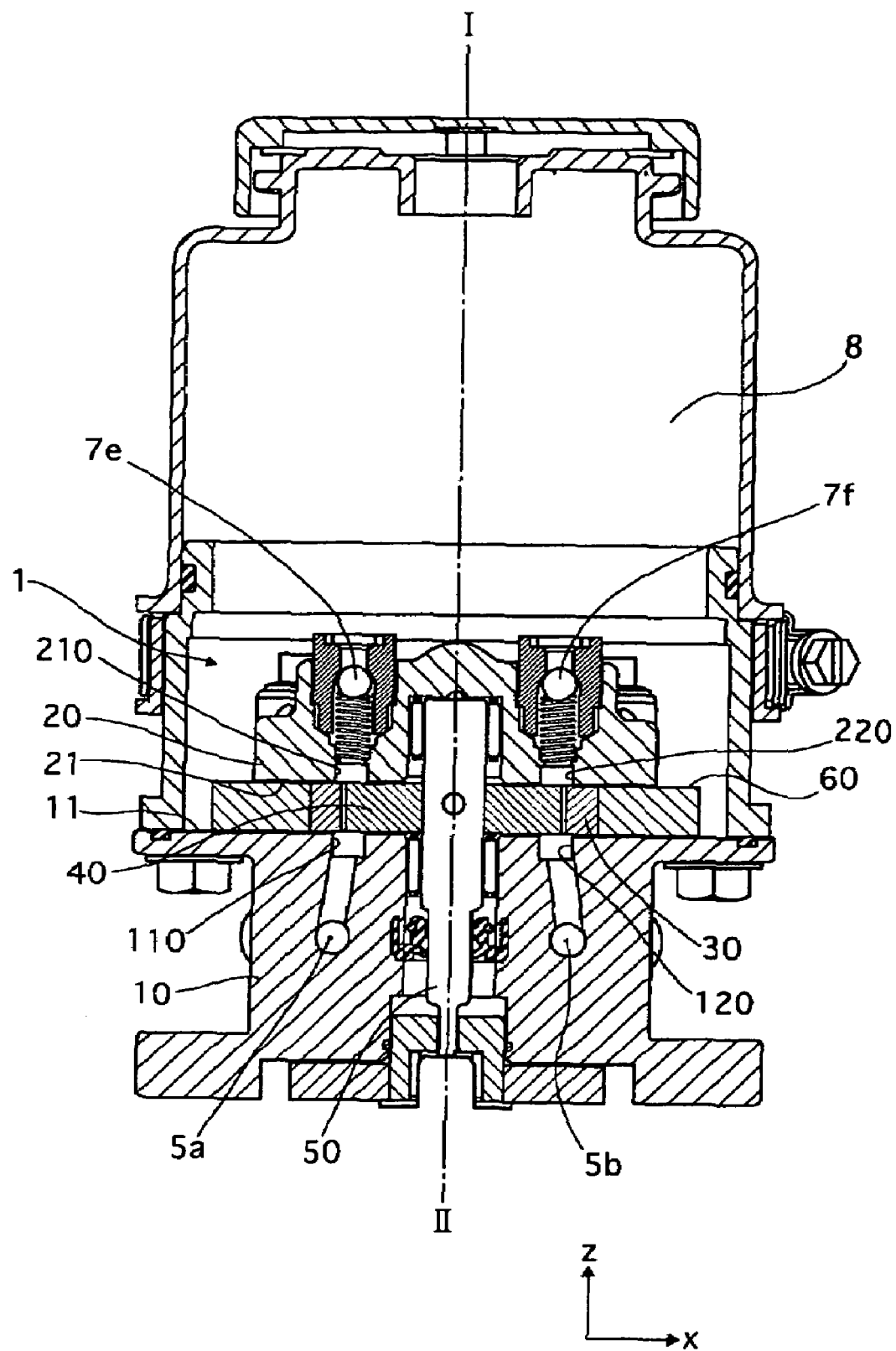
FIG. 2 shows a cross sectional view of the oil pump according to a first embodiment of the present invention.
Figure 3:
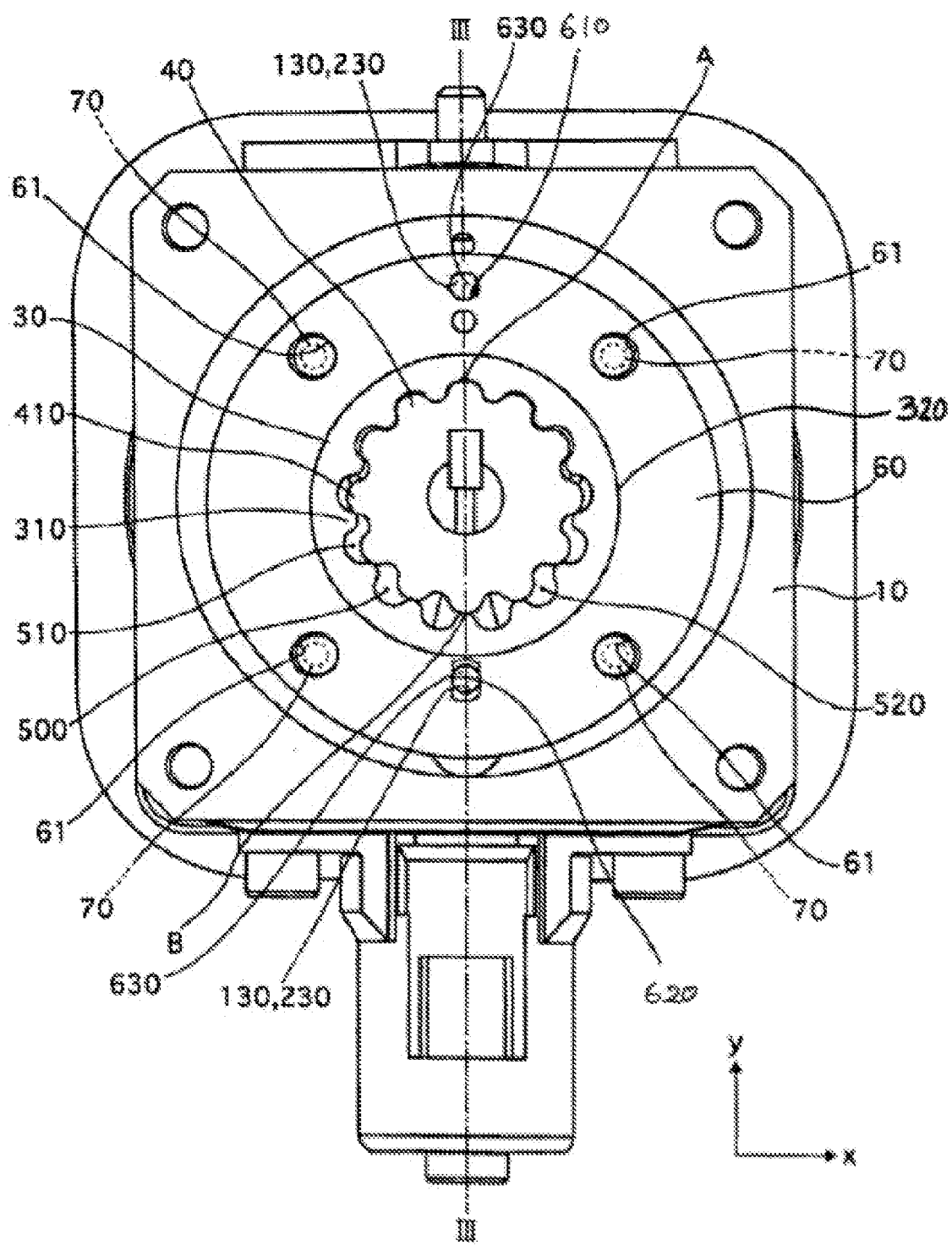
FIG. 3 shows a top view of the oil pump, except for a second housing, according to a first embodiment of the present invention.

Referring to the drawings, a description is made of embodiments of the present invention. FIG. 1 to FIG. 3 shows a first embodiment of the present invention.

A first embodiment is explained based on FIG. 1 to FIG. 4.

FIG. 1 shows a power steering system applying an oil pump according to a first embodiment of the present. When a driver turns a steering wheel $2a$, a pinion shaft $2d$ is driven through a steering shaft $2b$ and a column shaft $2c$. Then, a rack shaft $4a$ is moved axially for steering a front wheel by rack-and-pinion steering. The steering shaft $2b$ is provided with a torque sensor 3a for detecting a steering torque that is output as a torque signal to a control unit 3b.

A power steering mechanism, for assisting a movement of the rack shaft 4a that corresponds to the steering torque, is provided to the rack shaft 4a. The power steering mechanism is provided with a reversible oil pump 1 driven by a motor 1a and a cylinder 4b for moving the rack shaft 4a left and right. An inside of the cylinder 4b is provided with a piston 4c, capability left and right movement, which divides the cylinder 4b into a first cylinder chamber 4d and a second cylinder chamber 4e.

The first cylinder chamber 4d connects with the oil pump 1 through a first path 5a, and the second cylinder chamber 4e connect with the oil pump 1 through a second path 5b. The first path 5a and the second path 5b connect with a reservoir tank 8 through first and second paths 8a, 8b which is provided with each of check valves 7e, 7f respectively.

A fluid is prohibited from a backward flow to the reservoir tank 8 by the check valves 7e, 7f. When the amount of fluid is insufficient on the first and the second paths 8s, 8b, a fluid can be supplied from the reservoir tank 8.

The first and the second paths 5a, 5b are connected to a first connection and a second connection paths 6a, 6b, without passing the oil pump 1. The first connection and the second connection paths 6a, 6b are connected with a third connection path 6c via a first and second connect portion 9a, 9b. The third connection path 6c provides a normally open type solenoid valve 9 for opening and closing the third connection path 6c.

A first check valve and a second check valve 7a, 7b are provided between the first connect portion 9a and the first and the second paths 5a, 5b on the first connection path 6a. The first check valve 7a allows a flow from the first path 5a to the first connect portion 9a only. The second check valve 7b allows a flow from the second path 5b to the first connect portion 9a only.

A third check valve and a fourth check valve 7c, 7d are provided between the second connect portion 9b and the first and the second paths 5a, 5b on the second connection path 6b. The third check valve 7c allows a flow from the second path Sb to the second connect portion 9b only. The fourth check valve 7d allows to flow from the second path 5a to the second connect portion 9b only.

The torque signal coming from the torque sensor 3a, the switch signal coming from an ignition switch, the revolution signal coming from rotation sensor of an engine and the speed signal coming from speed sensor, are inputted to the control unit 3b, which decides a steering assist force based on these signals, and outputs an order signal to the motor 1a and the solenoid valve 9.

FIG. 2 shows a cross sectional view of the oil pump 1. The oil pump 1 is a so-called "reversible pump", which has a first and a second housings 10, 20, an outer rotor 30 and an inner rotor 40, drive shaft 50 and cam ring 60. An outer surface 21 of Pie second housing 20 faces the cam ring 60.

The cam ring 60 is made from iron, and the first and second housings 10, 20 are made from aluminum alloy. A linear expansion coefficient of the cam ring 60 and the first and the second housings 10, 20 are different from each other. However, the first and second housings 10, 20 have a same linear expansion coefficient. Each part can be made by a machining after a casting or by machining.

The outer rotor 30 and the inner rotor 40 are installed inside of a ring of the cam ring 60. An area which is located on a surface 11 of the first housing 10 toward—X direction with respect to line I-II is provided to a first suction port 110 and an area toward X direction with respect a line I-II is provided to a second discharge port 120. The suction port and the discharge port are finished machined parts.

FIG. 3 shows a top view of the oil pump except for the second housing 20. The cam ring 60 which is installed in the first and the second housings 10, 20 has bolt holes 61 that are located symmetrically about the axis line III-III. A bolt 70 is installed in the bolt holes 61, as well as bolt holes 140, 240 formed in the first and the second housings 10, 20 for fixing the first and second housings 10, 20. (Refer also to FIG. 4.) The bolt holes 61 are not precisely located for the cam ring 60, so as to provide clearance between an inner surface of the bolt holes 61 and an outer surface of the bolt 70.

An inner surface of the outer rotor 30 has an inner gear 310. The outer rotor 30 is rotatably installed with the cam ring 60 on an outer surface 320 thereof. The cam ring 60 is made from iron, and the first and second housings 10, 20 are made from aluminum alloy. Since the cam ring 60, which always with the outer rotor 30, is made from iron, it can resist wear due to rubbing with respect to the outer rotor 30. Since the first and second housings 10, 20 are made from an aluminum alloy a weight of the apparatus is decreased.

The inside of the outer rotor 30 is installed with the inner rotor 40 having an outer gear 410. The inner gear 310 has one tooth more than a number of teeth of the outer gear 410. Further, the number of the teeth of the inner gear 310 can be two or more than the number of the teeth of the outer gear 410.

When each rotor 30, 40 is installed, the inner gear 310 and the outer gear 410 mesh with each other. When the inner gear 310 and the outer gear 410 mesh, they are eccentric with respect to each other because the inner gear 310 has one more tooth than the outer gear 410. Due to this eccentric arrangement, a plurality of volume chambers 500 are formed by the inner gear 310 and the outer gear 410.

Due to this eccentric arrangement of the outer rotor 30 and the inner rotor 40, the inner gear 310 and the outer gear 410 are meshed together deeply along a Y-axis direction. Each gear is completely meshed at a point A (corresponding to a mesh portion in the claims) as an end portion of axis Y in FIG. 3. At that time, the volume chamber 500 has a minimum volume. The meshing of each gear will decrease in a minus direction of axis Y. Each gear is completely unmeshed at a point B (corresponding to a trap portion in the claims) when at the end of movement along axis Y in FIG. 3. At that time, the volume chamber 500 has a maximum volume. A clearance between the inner gear 310 and the outer gear 410 at the point B is practically 0 while avoiding a contact with each other.

Namely, when the inner rotor 40 and the outer rotor 30 are rotated counter clockwise, an area of the volume chamber 500 (corresponding to the first and the second suction ports 110, 210) which becomes a suction area 510, increasing in volume with rotation, is located in a minus direction of an axis X about a line III-III, and an area of the volume chamber 500 (corresponding to the first and the second discharge ports 120, 220) which becomes a discharge area 520, decreasing in volume with rotation, is located in a direction of an axis X. When each rotor is rotated clockwise, the suction area and the discharge area will be reversed.

The drive shaft 50 is provided in parallel to axis Z and is connected with the motor 1a, which drives the inner rotor 40. The inner rotor 40 and the outer rotor 30 are rotationally driven corresponding to rotation of the drive shaft 50 by a meshing of the inner rotor 40 and the outer rotor 30. The oil pump 1 works as a reversible pump when rotation of the drive shaft 50 is reversed.

A location corresponding to each of the points A and B that are end portions of axis Y is provided with a first axial hole 610 and a second axial hole 620. A dowel pin 630, which is installed in the first and the second axial holes, is also installed in dowel holes 130, 230, which are provided in the first and the second housings 10, 20 for positioning the first and the second housings 10, 20 and the cam ring 60.

One of the first and second axial holes 610, 620 or the dowel holes 130, 230 needs to be slightly oversized to compensate for error in manufacturing accuracy. In this embodiment, the dowel holes 130, 230 of the first and second housings 10, 20 are formed slightly larger than a diameter of the dowel pin 630. When assembled, there is a clearance between the dowel pin 630 and the first and the second dowel holes 130, 230.

Concerning above, the first axial hole 610 of the cam ring 60 is formed with high precision for positioning as a perfect circle that installs the dowel pin 630. Also the second axial hole 620 is formed with high precision as a slot extending in a direction of the Y axis. The second axial hole 620 is the slot comprising a pair of arcs and a pair of straight lines between the arcs.

The cam ring 60 is fixed to the first and the second housings 10, 20 at the second axial hole 620 (a slot) in a direction of the axis X, but without being fixed in a direction of the axis Y. On the other hand, the cam ring 60 is fixed to the first and the second housing 10, 20 at the first axial hole 610 (a perfect circle) with respect to a direction of each of axis X and Y. In this arrangement, the cam ring 60 which is fixed concerning a direction of each axis X and axis Y, can move to a direction of an axis Y around the first axial hole 610.

The bolt holes 140, 240 are holes for connecting the first and the second housings 10, 20. Therefore, the clearance between the dowel pin 630 and the dowel holes 130, 230 is exceedingly smaller than a clearance between the bolt 70 for connecting the first and the second housing 10, 20 and the bolt holes 140, 240.

Figure 5:
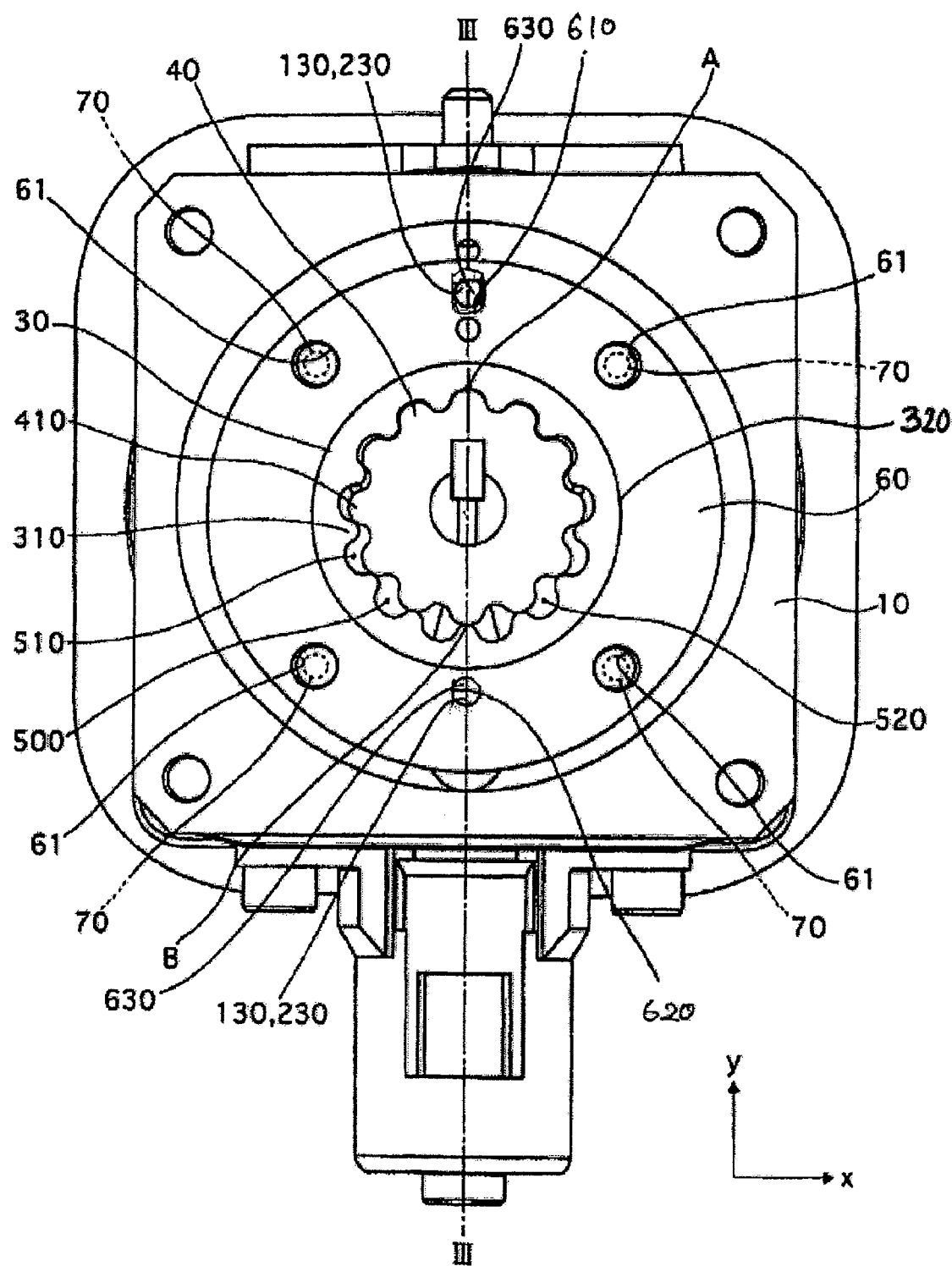
FIG. 5 shows a top view of the oil pump, according to an alternative embodiment of the invention.

At least one of the first and second axial hole should be a perfect circle, and the other should be a slot extending to a direction of an axis Y. Namely, the second axial hole 620 can be a perfect circle, and the first axial hole 610 can be a slot extending in a direction of an axis Y (FIG. 5). By this structure, the cam ring 60 can move in a direction of an axis Y around the first axial hole 610. In addition, an introduction path is formed on an outer surface of the cam ring 60 at a side of the second axial hole 620.

Figure 4:
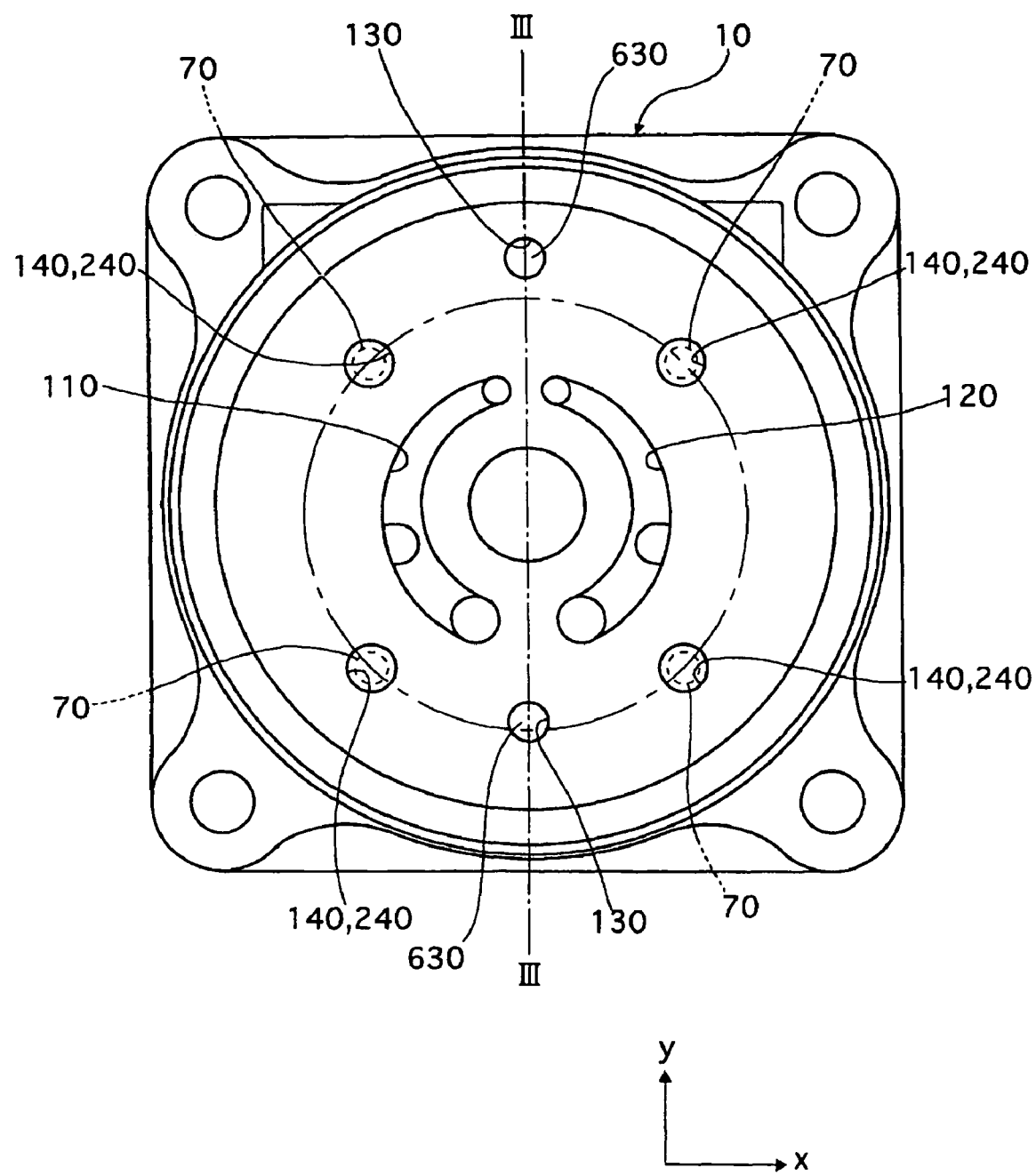
FIG. 4 shows an elevation view of a first housing of the oil pump according to a first embodiment of the present invention.

FIG. 4 shows an elevation view of the first housing 10. The first suction port 110 and the second discharge port 120, which are provided in the first housing 10, are crescent-shaped. They are located corresponding to a position of the inner gear 310 on the outer rotor 30 and a position of the outer gear 410 on the inner rotor 40. The first suction port 110 and the second discharge port 120 are blocked near the line III-III and are provided at positions that are symmetrical with respect to the line III-III. A radius length of each port is wide toward a minus axis Y.

While, it is not shown, the second suction port 210 and the second discharge port 220, which are provided to the second housing 20, are also crescent-shaped. The second suction port 210 and the second discharge port 220 are blocked near the line III-III. These ports 110, 210, 120 and 220 are formed by a machining or a finishing after a casting of the first and the second housings 10, to improve symmetry with respect to the line III-III.

The first housing 10 is provided with a first dowel hole 130 corresponding to the first and the second axial holes 610, 620 of the cam ring 60 on the line III-III. A diameter of the first dowel hole 130 is formed slightly larger than a diameter of the dowel pin 630 for positioning the cam ring 60. While not shown, the second housing 20 is provided with a second dowel hole 230 corresponding to same position. The cam ring 60 is positioned by the dowel holes 130, 230 of the first and the second housing 10, 20.

The first and the second housings 10, 20 are provided with the bolt holes 140, 240 that are symmetrical with respect to the line III-III. The bolt holes 140, 240 and the bolt hole 61 of the cam ring 60 cooperate with the bolt 70 for fixing the cam ring 60. Between each bolt hole 61, 140 and 240 and the bolt 70 is formed a clearance for improving an assembly. Namely, fixing by each bolt hole and the bolt is for improving the assembly, rather than for accurate positioning.

In the case of the disclosed embodiment in FIG. 1, the oil pump 1 can be a power steering pump. When the driver steers, the steering torque is detected by the torque sensor 3a. The oil pump 1 is driven by the motor 1a that is controlled by driving signal based on the steering torque from the control unit 3b. The following description assumes that the driving signal is counter clockwise rotation of the motor 1a.

As a result, the drive shaft 50 is driven to rotate counter clockwise by the motor 1a. Then, the inner rotor 40 and the outer rotor 30 are rotated by a rotation of the drive shaft 50. With this, the volume chamber 500 at the suction area 510 increases in volume and a negative pressure P occurs. On the other hand, at the discharge area 520, a volume is decreased and pressure is increased.

Oil is sucked from the first and the second suction port 110, 210 to the suction area 510 by the negative pressure P. The oil is moved to the discharge area 520 by the inner gear 310 and the outer gear 410, which are rotated along a direction of revolution of each rotor 40, 30. The oil which is increased by a discharge pressure P* at the discharge area, is discharged from the first and second discharge ports 120, 220.

Pressure P* of the discharge area 520 is higher than pressure P of the suction area 510. Thus, a pressure differential P1 occurres between a pressure of the suction area 510 and a pressure of the discharge area 520. The pressure differential P1 is defined such that P1=P*–P (P*>P). Therefore, the outer rotor 30 is pushed by the pressure differential P1 to the direction of the axis X.

When the steering wheel is turned to the opposite direction by the driver, the torque sensor 3a detects the steering. The drive shaft 50, if rotating counters clockwise, is switched to rotate clockwise by the control unit 3b. At that time, the oil pump 1a having symmetry with respect to the line III-III, switches the direction of the suction area and the discharge area. Namely, the first and the second suction ports and a suction area 510 change to a discharge side, while the first and second discharge ports and the discharge area 520 change to a suction side.

Consequently, a pressure P' of the suction area 510 become higher than a pressure P*' of the discharge area 520. The pressure differential P2 is defined such that P2=P'–P*' (P'>P*'). Therefore, the outer rotor 30 is pushed by the pressure differential P2 to direction of the axis X.

The oil pump 1 generates heat by its operation. As a result, the first and the second housings 10, 20 and the cam ring 60 undergo a thermal expansion based on a respective linear expansion coefficient. The first and the second housings 10, 20 are made from an aluminum alloy, and the cam ring 60 is made from iron. The linear expansion coefficient of the aluminum alloy is larger than that of iron. Therefore, the expansion amount of the first and the second housing 10, 20 is larger than the cam ring 60.

If the cam ring 60 and the first and the second housings 10, 20 are fixed to each other, there can be relative un-movement, so that a large load is applied to the dowel pin 630 because each expansion amount is different. If the dowel pin 630 is deformed by the load, positioning accuracy is degraded.

In this embodiment, the cam ring 60 is fixed to the first and the second housings 10, 20 with respect to the direction of the axis X at the first and the second axial hole 610, 620. On the other hand, the cam ring 60 can move in the direction of axis Y around the first axial hole 610, since the second axial hole 620 is formed as a slot extending to the axis Y.

In this manner, when the cam ring 60 and the first and the second housings 10, 20 are moved relatively due to different expansion amounts, a relative movement in the direction of the axis Y is absorbed by the second axial hole 620 that is formed as a slot extending to the axis Y. The first and second axial holes 610, 620 are formed symmetrically with respect to the line III-III in FIG. 3. Also each bolt hole 61, 140 and 240 are formed symmetrically with respect to the line III-III and has a clearance between an inner surface of the bolt holes 61, 140 and 240 and an outer surface of the bolt 70. Since the first and the second housings 10, 20 and the cam ring 60 expand symmetrically in direction of the axis Y without a expansion of the axis X with respect to the line III-III, the expansion of the direction of the axis X does not influence positioning accuracy.

In the relevant art, when a line which connects a mesh portion in which the pump volume is minimum and a trap portion in which the pump volume is maximum are positioned between 6 o'clock and 12 o'clock, the housing and the cam ring is fixed to a position which is at 3 o'clock and 6 o'clock by a screw. The hole for screwing is formed to the cam ring and the housing, one of these holes has to be formed slightly large to account for a machining error. The cam ring could be eccentric in the direction of the width thereof depending on the amount of affording for this machine error. When a pump is applied for a reversible pump switching suction and a discharge based on a direction of a rotation of a trochoid pump, each of the characteristics of discharge could be changed between normal and reverse direction of the rotation.

In this embodiment of the present invention, a location corresponding to each of points A and B that are end portions of axis Y is provided with a first axial hole 610 and a second axial hole 620. The second axial hole 620 is formed with high accuracy as a slot extending in the direction of the Y axis. The first axial hole 610 of the cam ring 60 is formed with high accuracy as a perfect circle that has no clearance between the inner surface of the first axial hole 610 and the outer surface of the dowel pin 630. The dowel pin 630 which is installed in the first and the second axial holes is also installed in dowel holes 130, 230 in the first and the second housings 10, 20, accurately positioning the first and the second housings 10, 20 and the cam ring 60.

When the steering wheel is steered in an opposite direction by the driver, a pressure differential in the pump chamber is switched to alternate a suction area to a discharge area, a force against the outer rotor 30 is reversed, and the cam ring 60 and the outer rotor 30 are maintained in a symmetrical a position with respect to the line III-III in FIG. 3. As a result, a volume change of the suction area 510 and the discharge area 520 are avoided when the drive shaft is reversed. In this way, the oil pump has a stable discharge characteristic between normal and reverse direction of the rotation, when the steering wheel is steered to an opposite direction by the driver.

The foregoing embodiment has further merit. An error in the accuracy of a process of the manufacturing can be absorb because the second axial hole 620 is formed as a slot extending to the axis Y. When the cam ring 60 and the first and the second housing 10, 20 are moved relatively due to different expansion amounts, a relative movement of the direction axis Y is absorbed by the second axial hole 620 that is formed as a slot extending to the axis Y. This can prevent error of positioning accuracy due to thermal expansion that results from heat of the pump 1a.

The entire contents of Japanese Patent Application P2004-293148 filed Oct. 6, 2004 are incorporated herein by reference.

What is claimed is:

1. An oil pump comprising;
a cam ring,
an outer rotor having inner teeth, which is rotatably provided inside of the cam ring,
an inner rotor having outer teeth, which is engageable with the inner teeth of the outer rotor,
a drive shaft which rotatably drives the inner rotor,
a first housing and a second housing which are provided at opposite ends of the cam ring,
a plurality of volume chambers which are formed between the inner teeth of the outer rotor and the outer teeth of the inner rotor,
a first axial hole, which is formed in the cam ring and is positioned corresponding to a mesh portion having a minimum volume of the volume chambers,
a second axial hole, which is formed in the cam ring and is positioned corresponding to a trap portion having a maximum volume of the volume chambers,
a suction port and a discharge port, which are formed at least in one of said first and second housings and are open to the volume chambers between the mesh portion and the trap portion, are positioned at a line symmetry of an axis line between the mesh portion and the trap portion,
a first dowel pin inserted into the first housing, the second housing and the first axial hole, and
a second dowel pin inserted into the first housing, the second housing and the second axial hole,
the suction port and the discharge port are reversed depending on a rotary direction of the drive shaft,
wherein at least one of the first and second axial holes is formed as a slot extending along the axis line.

2. The oil pump as claimed in claim 1,
wherein the second axial hole is formed as a slot extending along the axis line.

3. The oil pump as claimed in claim 2,
wherein an outer diameter of the first dowel pin is same as an inner diameter of the first axial hole.

4. The oil pump as claimed in claim 2,
wherein the second axial hole is the slot comprising a pair of arcs and a pair of straight lines between the arcs.

5. The oil pump as claimed in claim 1,
wherein the first housing and the second housing are made from material which has a same linear expansion coefficient.

6. The oil pump as claimed in claim 1,
wherein the first housing and the second housing are made from an aluminum alloy, and
wherein the cam ring is made from an iron.

7. The oil pump as claimed in claim 1,
further comprising a plurality of bolts which connect the first housing and the second housing,
wherein the plurality of bolts are provided symmetrically with respect to the axis line on the first and the second housings.

8. The oil pump as claimed in claim 7,
wherein the first and second housing have a plurality of holes, each of the plurality bolts is disposed in a respective hole, and
at least one of the bolts has a clearance between an inner surface of the holes and an outer surface of the bolt.

9. The oil pump as claimed in claim 1,
the suction port and the discharge port are provided symmetrically with respect to the axis line on the first and the second housings.

10. The oil pump as claimed in claim 9,
wherein the suction port and the discharge port are finished machined parts.

11. The oil pump as claimed in claim 1,
wherein the first axial hole is formed as a slot extending along the axis line.

12. An oil pump comprising;
a cam ring,
an outer rotor having inner teeth, which is rotatably provided inside of the cam ring,
an inner rotor having outer teeth, which is engageable with the inner teeth of the outer rotor,
a drive shaft which rotatably drives the inner rotor,
a first housing and a second housing which are provided at opposite ends of the cam ring,
a plurality of volume chambers which are formed between the inner teeth of the outer rotor and the outer teeth of the inner rotor,
a first axial hole, which is formed in the cam ring and is positioned corresponding to a mesh portion having a minimum volume of the volume chambers,
a second axial hole, which is formed in the cam ring and is positioned corresponding to a trap portion having a maximum volume of the volume chambers,
a suction port and a discharge port, which are formed at least in one of said housings and are open to the volume chambers between the mesh portion and the trap portion, are positioned at a line of symmetry of an axis line between the mesh portion and the trap portion,
a first dowel pin inserted into the first housing, the second housing and the first axial hole,
a second dowel pin inserted into the first housing, the second housing and the second axial hole, and
the suction port and the discharge port are reversed depending on a rotary direction of the drive shaft,
wherein the first dowel pin and the second dowel pin are provided at positions that are symmetrical with respect to the axis line on the first and the second housing, and
wherein the suction port and the discharge port are provided at positions that are symmetrical with respect to the axis line,
wherein the second axial hole is formed as a slot extending along the axis line.

13. The oil pump as claimed in claim 12,
wherein the second axial hole is the slot comprising a pair of arcs and a pair of straight lines between the arcs.

14. The oil pump as claimed in claim 13,
wherein the first and second housing have holes,
each of the plurality bolts is disposed in a respective hole, and
at least one of the bolts has a clearance between an inner surface of the holes and an outer surface of the bolt.

15. An oil pump comprising;
a cam ring,
an outer rotor having inner teeth, which is rotatably provided inside of the cam ring,
an inner rotor having outer teeth, which is engageable with inner teeth of the outer rotor,
a drive shaft which rotatably drives the inner rotor,
a first housing and a second housing which are provided at opposite ends of the cam ring,
a plurality of volume chambers which are formed between the inner teeth of the outer rotor and the outer teeth of the inner rotor,
a first axial hole, which is formed in the cam ring and is positioned corresponding to a mesh portion having a minimum volume of the volume chambers,
a second axial hole, which is formed in the cam ring and is positioned corresponding to a trap portion having a maximum volume of the volume chambers,
a suction port and a discharge port, which are formed at least in one of said housings and are open to the volume chambers between the mesh portion and the trap portion, are positioned at a line symmetry of an axis line between the mesh portion and the trap portion,
a first dowel pin inserted into the first housing, the second housing and the first axial hole,
a second dowel pin inserted into the first housing, the second housing and the second axial hole, and
the suction port and the discharge port are reversed depending on a rotary direction of the drive shaft,
wherein the second axial hole is formed as a slot extending along the axis line.

16. The oil pump claimed in claim 15,
wherein the second axial hole is the slot comprising a pair of arcs and a pair of straight lines between the arcs.

17. The oil pump claimed in claim 15,
wherein the first housing and the second housing are made from an aluminum alloy.

18. The oil pump claimed in claim 15,
wherein an outer diameter of the first dowel pin is same as an inner diameter of the first axial hole.

* * * * *